(No Model.) 2 Sheets—Sheet 1.

J. GALLAND.
THRASHING MACHINE.

No. 391,139. Patented Oct. 16, 1888.

Attest:
Geo. T. Smallwood.
Clement Smallwood.

Inventor:
Joseph Galland.
By A.U. Smith & Son
atty's (No Model.) 2 Sheets—Sheet 2.

J. GALLAND.
THRASHING MACHINE.

No. 391,139. Patented Oct. 16, 1888.

Attest:
Geo. T. Smallwood.
Clement Smallwood.

Inventor:
Joseph Galland.
By A. U. Smith & Son,
attys.

UNITED STATES PATENT OFFICE.

JOSEPH GALLAND, OF MANSFIELD, OHIO, ASSIGNOR TO THE AULTMAN & TAYLOR COMPANY, OF SAME PLACE.

THRASHING-MACHINE.

SPECIFICATION forming part of Letters Patent No. 391,139, dated October 16, 1888.

Application filed March 12, 1888. Serial No. 267,037. (No model.)

*To all whom it may concern:*

Be it known that I, JOSEPH GALLAND, of Mansfield, county of Richland, and State of Ohio, have invented a new and useful Improvement in Thrashing-Machines, of which the following is a full, clear, and exact description, reference being had to the accompanying drawings, making part of this specification.

My invention relates to the combination, with the straw shaker and carrier of a thrashing-machine, of cutting and bruising cylinders, by means of which the straw, after the grain has been separated from it, is cut into short pieces and then crushed or broken and bruised for adapting it to be used for feeding stock, as hereinafter described and claimed.

Figure 1:
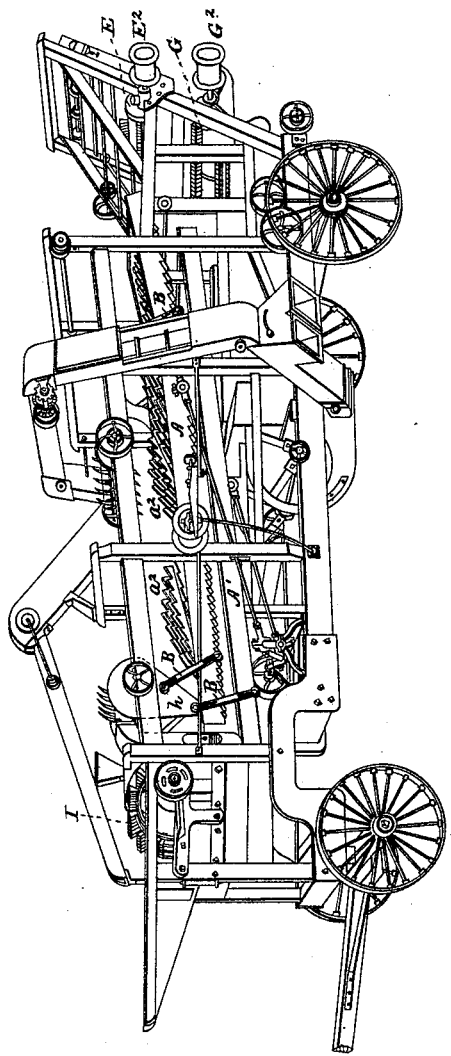
Figure 3:
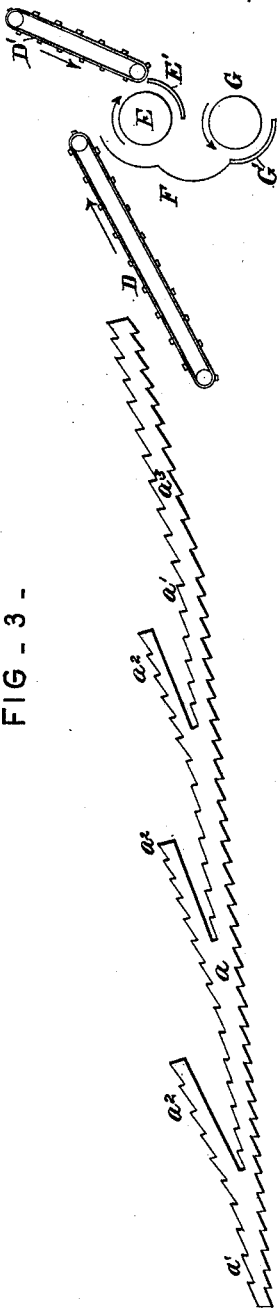
Figure 2:
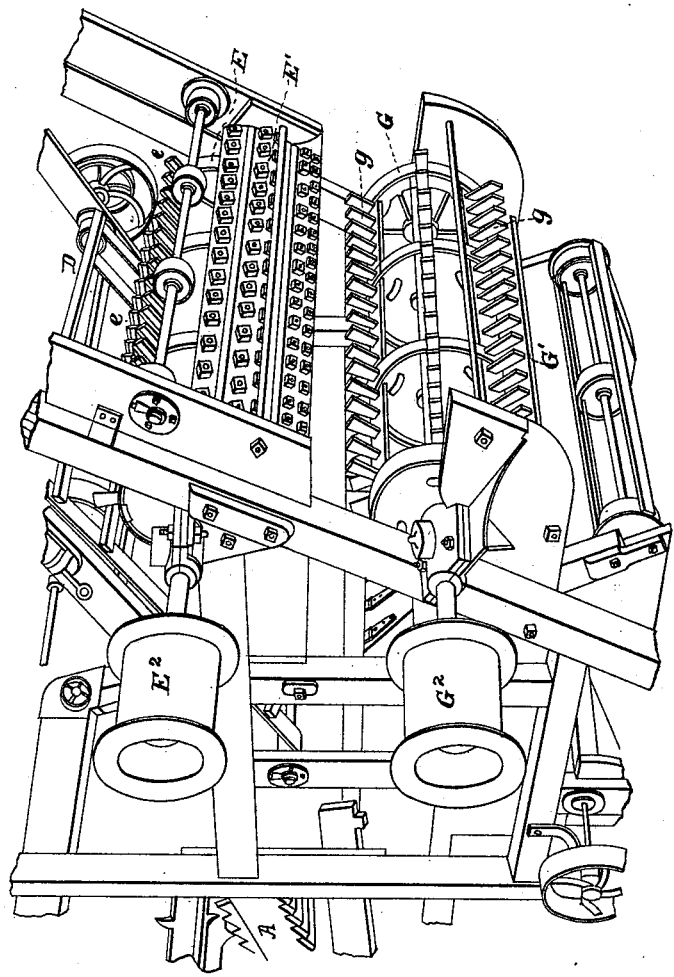

In the accompanying drawings, Figure 1 is a perspective view of a thrashing-machine with my improvements applied. Fig. 2 is a perspective view, enlarged, of the rear or discharging end of the machine, showing the cutting and bruising cylinders. Fig. 3 shows in side elevation one of the straw shaker and carrier bars and the relation thereto of the cutting and bruising cylinders and the devices for feeding the straw thereto.

The frame of the machine is of any usual or preferred construction, except that it is extended somewhat in length to provide room at its rear end for the application thereto of the cutting and bruising cylinders and concaves and the necessary appliances for feeding the straw thereto after it has passed over the straw shaker and carrier and been freed from the grain, as will be described.

A and A' indicate the upper and lower shakers, or shaker and screen, suspended upon links B under the usual arrangement, whereby they are adapted to move alternately in opposite direction, counterbalancing each other, and, except in particulars which will be pointed out, are of any usual or preferred construction. The frame of the upper shaker is of the usual rectangular form, and has a flooring of transverse boards or slats, set inclined in the usual manner, to insure the passage of the straw while permitting the escape of the grain between them to the lower shaker or screen, in a manner well understood. Upon these flooring-boards are rigidly secured a series of bars, $a$, placed side by side, but with sufficient space between them to permit the ready passage of the grain, said bars being placed on edge and extending the entire length of the shaker A. One of these bars is shown in side elevation, Fig. 3. They are provided with saw or ratchet shaped teeth $a'$ on their upper edges, which permit the passage of the straw over them toward the rear, but prevent its return, and at regular intervals have inclined arms or projections $a^2$, which diverge rearwardly from the main body of the bar, and are also saw-toothed on their upper faces similar to and for a like purpose with the body of the bar. These arms $a^2$ serve to gradually lift the straw from and then to let it fall back again on the bars $a$, for the purpose of more thoroughly agitating it and insuring the separation of the grain from it, in a manner that will be readily understood. The rear ends of the bars $a$ are inclined upward, as shown at $a^3$, for a similar purpose and for retarding the discharge of the straw from the shaker until it is thoroughly free from grain.

The straw after it passes from the shaker A is received upon an inclined elevating endless carrier, D, of any suitable construction, by means of which the straw is deposited upon an apron or carrier, D', from which it is fed to the cutting cylinder E, similar in construction to the ordinary thrashing-cylinder, but smaller, and provided with teeth $e$, sharpened on both their front and rear edges, adapting them to be reversed when dulled and placed in rows and at short intervals apart sufficient to allow them to pass between similarly constructed and arranged teeth applied to the concave E'. By this construction the straw is cut into short bits or pieces in its passage through the concave E', and, escaping from the latter, is thrown by the rapid revolution of the cylinder E and the current of air produced thereby against a drum or apron, F, from which it is fed to a bruising-cylinder, G, operating in a concave, G', arranged below and preferably slightly forward of the cylinder E, for receiving the straw therefrom.

The cylinder and concave G and G' are similar in construction to E and E', above described, except that the teeth $g$ thereof, instead of being made sharp, are made blunt or with broad edges for adapting them to bruise and crush or break the cut straw fed to them from the cutting-cylinder.

The direction of rotation or movement of the carriers or aprons D and D' and of the cylinders E and G is indicated by the arrows in Fig. 3, the straw in the arrangement shown passing behind and under the cylinder E and in front of and under the cylinder G, such movement in connection with the current of air generated by the rapid revolution of said cylinders facilitating greatly the passage of the straw from one cylinder to the other. After leaving the concave G', the straw may be deposited directly on the ground therefrom or upon an endless carrier, by means of which it may be removed to a distance from the machine, as preferred.

The shafts of cylinders E and G are supported in suitable bearings in the extended frame of the thrashing-machine, and are provided with band-pulleys $E^2 G^2$, through which motion is imparted to said cylinders from any suitable driving shaft or shafts.

In the drawings, Fig. 1, I have shown the links supporting the forward ends of the shakers attached to pins on what I call "hanger-plates" $h'$, in which the picker-reel is also journaled. One of these plates is secured to each side of the frame, and in practice I form screw-threaded perforations in them, and into these the pins $d$, which support the links B, are screwed, as indicated in the details, sectional view, Fig. 1ª. The links may, however, be attached to any suitable point on the frame.

I indicates the thrasher-cylinder, which, with its concave, is of any usual or preferred construction, and from which the straw and grain pass to the shaker and carrier A, from which point the operation of the machine will be readily understood from the foregoing description.

Parts of the machine not specifically described may be constructed and arranged in any usual or preferred manner.

Having now described my invention, I claim as new—

1. The combination, with the thrashing devices and the straw shaker and carrier, of the straw-cutting cylinder and concave and the interposed carrier for conveying the straw from the shaker to the cutting-cylinder, substantially as described.

2. The combination, with the straw-shaker of a thrashing-machine, of the straw-cutting cylinder and concave, the carrier for conveying the straw thereto, and the straw-bruising cylinder and concave, substantially as described.

3. The combination, with a thrashing-machine, of the straw-cutting cylinder, the straw-bruising cylinder, and an interposed connecting drum or apron, substantially as described.

4. The combination, with the thrashing devices and the straw-shaker, of the straw-cutting cylinder, the carrier or apron for conveying the straw thereto, the bruising-cylinder, and the apron for conducting the cut straw thereto, substantially as described.

5. The combination, in a thrashing-machine, of the straw-shaker A, carrier D, cutting-cylinder E, concave E', drum or apron F, and the bruising-cylinder G and its concave G', all substantially as described.

In testimony whereof I have hereunto set my hand this 10th day of March, A. D. 1888.

JOS. GALLAND.

Witnesses:
CHAS. F. HARDING,
B. L. BEVINGTON.